United States Patent [19]

Zinga

[11] Patent Number: 5,389,246
[45] Date of Patent: Feb. 14, 1995

[54] RESERVOIR FILTER

[75] Inventor: William L. Zinga, Arlington Heights, Ill.

[73] Assignee: Zinga Industries Inc., Reedsburg, Wis.

[21] Appl. No.: 191,135

[22] Filed: Feb. 3, 1994

Related U.S. Application Data

[63] Continuation of Ser. No. 6,545, Jan. 21, 1993, abandoned.

[51] Int. Cl.[6] ............... B01D 35/02; B01D 35/147
[52] U.S. Cl. ............................ 210/130; 210/172; 210/442; 210/453; 210/459
[58] Field of Search ............ 210/130, 172, 438, 448, 210/451–454, 459, 477, 482, 435, 437, 442

[56] References Cited

U.S. PATENT DOCUMENTS

| | | | |
|---|---|---|---|
| 3,308,956 | 3/1967 | Yee et al. | 210/232 |
| 3,625,363 | 12/1971 | Eberle | 210/130 |
| 4,017,400 | 4/1977 | Schade | 210/439 |
| 4,212,739 | 7/1980 | Hilton et al. | 210/172 |
| 4,283,281 | 8/1981 | Cogan | 210/453 |
| 4,419,240 | 12/1983 | Rosaen | 210/452 |
| 4,446,731 | 5/1984 | Martin | 73/334 |
| 4,557,834 | 12/1985 | Mason | 210/445 |
| 5,026,478 | 6/1991 | Tanabe et al. | 210/232 |
| 5,200,067 | 4/1993 | Sann | 210/172 |

*Primary Examiner*—Matthew O. Savage
*Attorney, Agent, or Firm*—Kenyon & Kenyon

[57] ABSTRACT

A suction and return line reservoir filter that can be used under high negative pressure suction applications is provided with a positive engaging means adapted to hold the bowl against the filter housing even during such high negative differential pressure suction operations. An access cover is provided which includes three equally spaced axial extensions or fingers to force the bowl against the filter housing.

11 Claims, 6 Drawing Sheets

RESERVOIR FILTER

This application is a continuation of application Ser. No. 08/006,545, filed on Jan. 21, 1993, now abandoned.

BACKGROUND OF THE INVENTION

The present invention is related to suction and return line reservoir filters and, in particular, to a suction and return line reservoir having an improved cover to bowl seal integrity during suction operations, even under extreme negative pressures. While having a wide array of applications, such filters may be used to filter petroleum based fluids and may be installed at an opening on a wall of a tank or reservoir.

In the past, reservoir filters included a bowl having a first port which fit into a filter body having a second port. An access cover was attached to the top of the filter body in a sealed manner. A compressed spring or coil disposed between the access cover and a by-pass valve (friction fit to the top of a filter element, which in turn was in turn friction fit to the inner bottom surface of the bowl) was employed to force a flange at the rim of the bowl against a ledge on the filter body thereby maintaining a seal. While this arrangement is suitable for some positive pressure applications, operational difficulties are sometimes encountered in negative differential pressure suction operations. When a negative differential pressure suction operation is desired, the low pressure created in the cavity formed by the cover, filter body, and bowl urge the bowl toward the access cover against the biasing force of the spring. During such negative pressure suction operations, the spring may further compress thereby compromising the integrity of the seal between the filter body and the bowl. The elements of typical prior art filters of this type are shown in FIGS. 5a and 5b which illustrate the problem of the prior art filters.

Therefore, an object of the present invention is to provide a suction and return line reservoir filter that is suitable for use in negative differential pressure suction applications. In particular, an object of the present invention is to provide a positive means adapted to urge the bowl downward against the filter housing even during such high negative differential pressure suction operations.

SUMMARY OF THE INVENTION

The present invention achieves the aforementioned objects by providing a plurality of axially extending members or fingers at the periphery of the access cover. In a preferred embodiment, these fingers are integrally formed with the access cover. The access cover and fingers are preferably die cast. The access cover preferably includes three fingers although more can be provided. The fingers are preferably disposed around the circumference of the access cover separated by an angle which equals 360 degrees divided by the number of fingers, although the scope of the present invention encompasses fingers separated by other angles as well.

In an alternate embodiment, rather than providing the access cover 3 with downward extending members, the periphery of the bowl 1 may be provided with similar upward extending members. In a further alternate embodiment, a separate segmented spacer and/or adapter may be disposed between the access cover 3 and the bowl 1 to provide a similar positive means for holding down the bowl 1.

DETAILED DESCRIPTION

Figure 4:
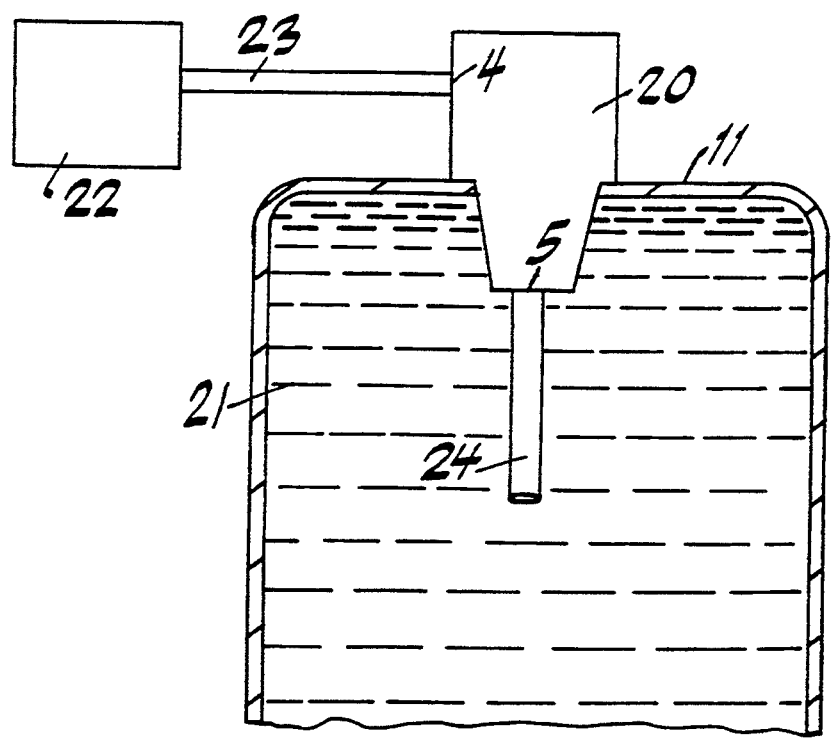
FIG. 4 is a schematic illustration of an application of the reservoir filter of the present invention.

The schematic of FIG. 4 illustrates a typical application for reservoir filters. The filter 20 is joined at an opening in the top wall (i.e., ceiling) of a reservoir 11. The reservoir 11 can accommodate a fluid 21, such as petroleum based fluids for example. The filter 20 includes a first port 4 which is connected to the suction side (port) of a fluid pump 22 via piping 23. Depending on the pumping direction or state of the pump 22, the filter 20 acts either as a suction filter or return filter. A second port 5 can expel or intake fluid either directly or via piping 24 disposed in reservoir 11.

Figure 5B:
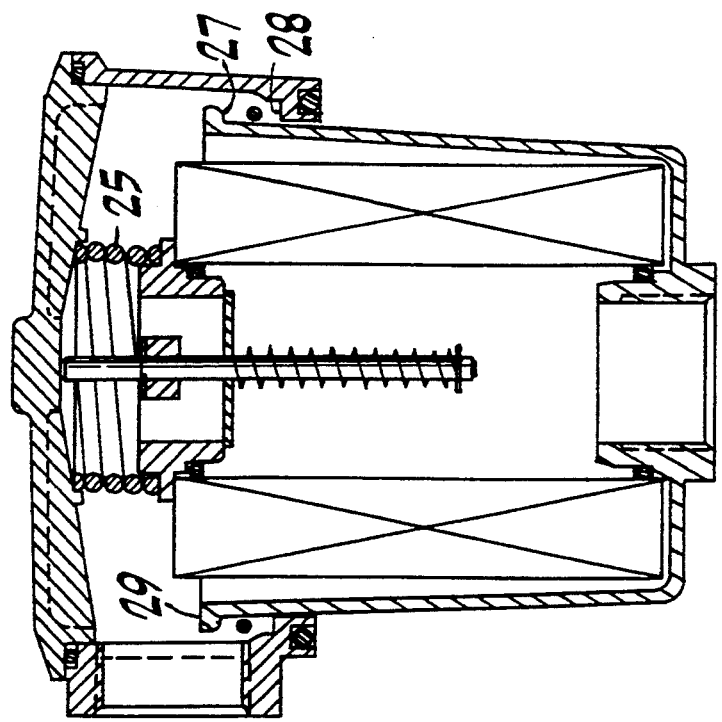
FIGS. 5a and 5b illustrate the effect of high negative differential pressure suction operations on known reservoir filters.
Figure 5A:
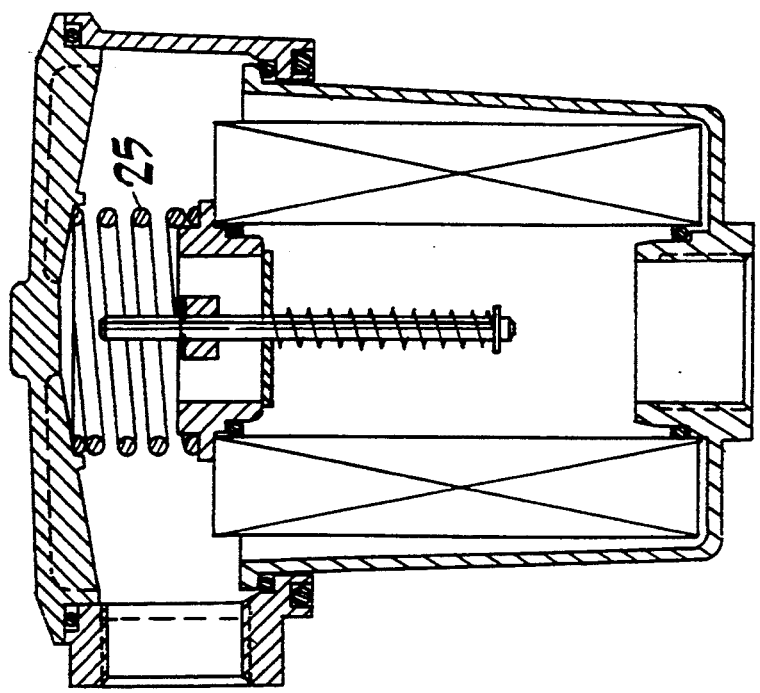

FIGS. 5a and 5b depict cross-sectional side views of a known reservoir filter and illustrate the disadvantage of the known reservoir filter as described in the BACKGROUND OF THE INVENTION section above. As shown in FIG. 5a, during normal operation a compressed coil 25 disposed between the access cover and a by-pass valve (friction fit to the top of a filter element, which in turn is friction fit to the inner bottom surface of the bowl) forces the flange 27 at the rim of the bowl against a ledge 28 on the filter body. As described above, when a suction application is desired, a lower pressure is created in the cavity formed by the access cover, filter body, and bowl. As shown in FIG. 5b, at significant negative differential pressures, the bowl is forced upwards and further compresses the compressed spring 25 thereby relieving the force exerted on the seal between the flange 27 at the rim of the bowl and the ledge 28 of the filter body.

Figure 1:
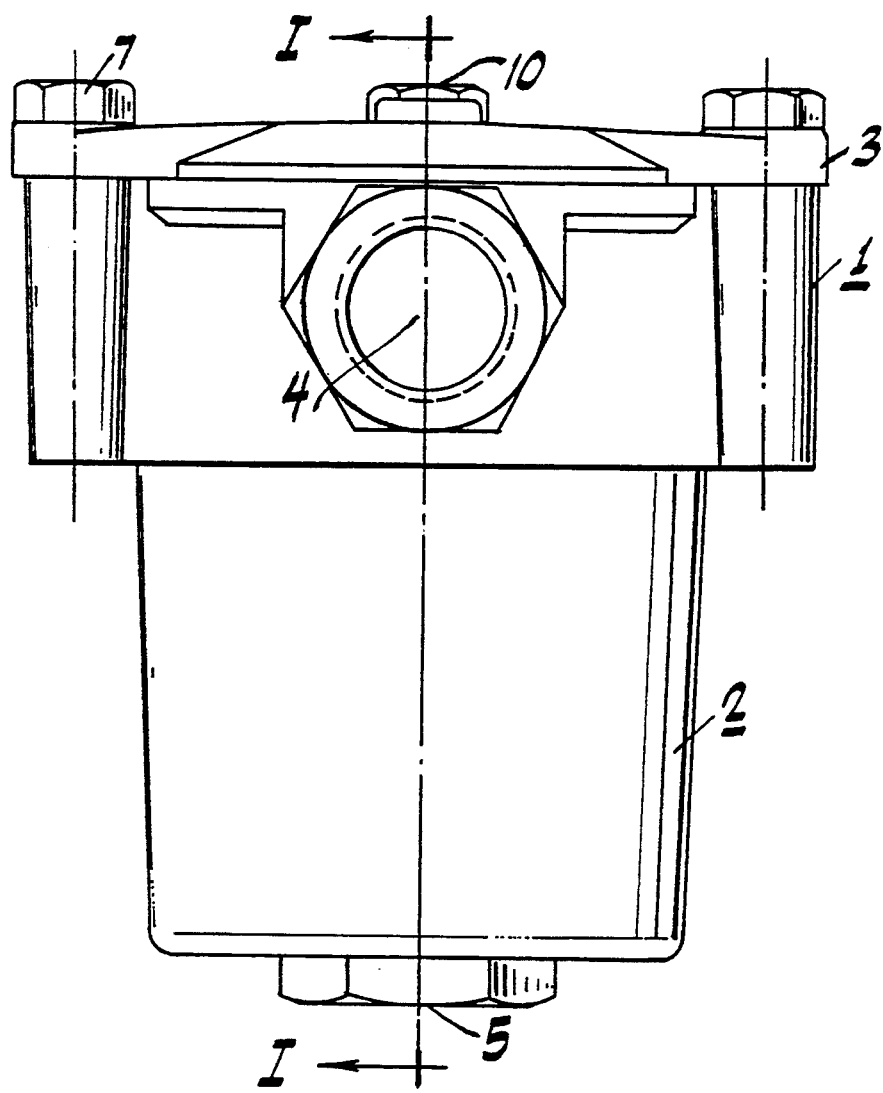
FIG. 1 is a front end elevation view of the reservoir filter according to the present invention.
Figure 2:
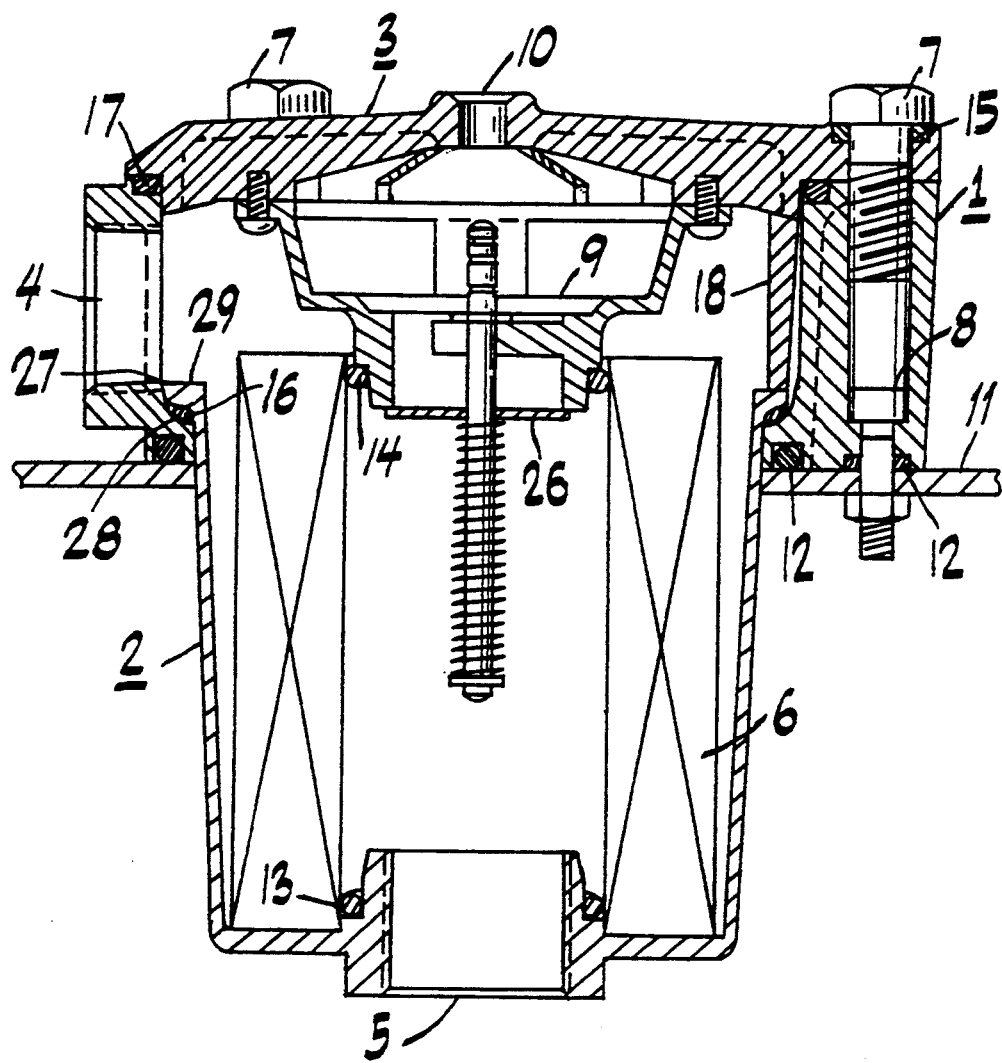
FIG. 2 is a cross sectional side elevation view taken along line I—I of FIG. 1 of the reservoir filter of FIG. 1.
Figure 3:
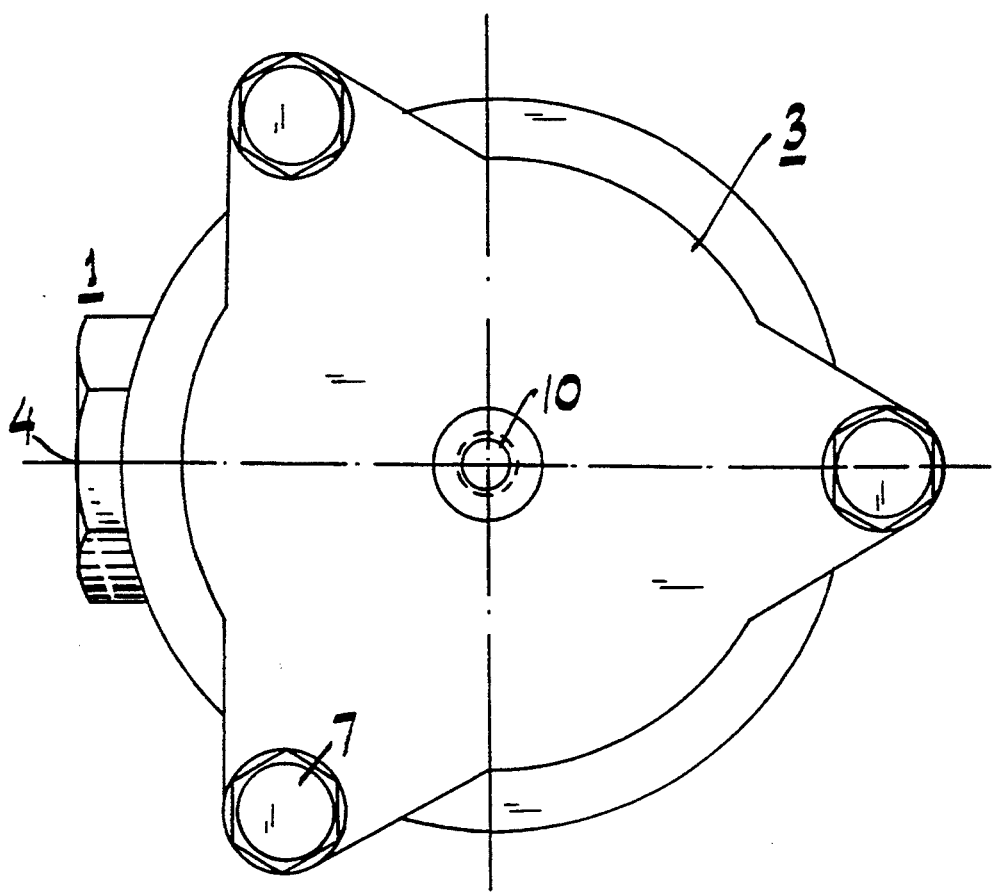
FIG. 3 is a top view of the reservoir filter of FIG. 1.

As shown in FIGS. 1-3, the reservoir filter 30 of the present invention includes a filter body 1, a bowl 2, and an access cover 3. As shown in FIG. 2, a first port 4 is formed in the filter body 1. The filter body 1 further includes a plurality of bolts 8 which permit the filter body 1 to be bolted to a wall 11 of a reservoir or tank. The filter body includes sealing means 12, such as O-rings for example, adapted to form a seal between the filter body 1 and the wall 11 of the reservoir or tank.

The bowl 2 includes a radially outward extending flange 27 at its rim, the bottom of which abuts a ledge 28 on the inside surface of the filter body 1. A sealing means 16, such as an O-ring for example, is provided between the bottom of the flange 27 of the bowl 2 and the ledge 28 of the filter body 1. A second port 5 is formed in the bottom portion of the bowl 2 by means of a fitting. A removable cylindrical filter element 6 is inserted into the bowl and held in place by a friction fit between the inner radial surface of the bottom of the filter element 6 and the outer radial surface of the fitting of the second port 5. A sealing means 13, such as an O-ring for example, is further provided between the inner radial surface of the filter element 6 and the outer radial surface of the fitting of the second port 5. The bowl is preferably cast or fabricated metal or molded plastic.

The access cover 3 is bolted onto the filter body 1 with a plurality of bolts 7, preferably three. A seal 15, such as an O-ring for example, is provided between the cover 1 and each of the bolts 7. Another seal 17, such as an O-ring for example, is provided between the access cover 3 and the filter body 1. The access cover 3 may include a gauge port 10 adapted to accommodate a pressure gauge. The cover 3 may also include a by-pass valve 9. The outer radial surface of the bottom of the by-pass valve 9 forms a friction fit with the inner radial surface of the top of the filter element 6. A sealing means 14, such as an O-ring for example, is provided between the outer radial surface of the by-pass valve 9 and the inner radial surface of the filter element 6. The by-pass valve 9 operates in a known manner. That is, the by-pass valve 9 permits fluid to by-pass the filter element 6 and flow directly between the first port 4 and the second port 5 when the filter element 6 becomes clogged, thereby preventing the pressure and/or vacuum differential from increasing beyond a predetermined limit. A by-pass valve disc 26 is shown in position for positive pressure or return line applications. The by-pass vane disc 26 would be relocated to top side of hole in by-pass valve assembly casting 9 to hold down the element assembly for negative pressure suction applications.

Figure 6:
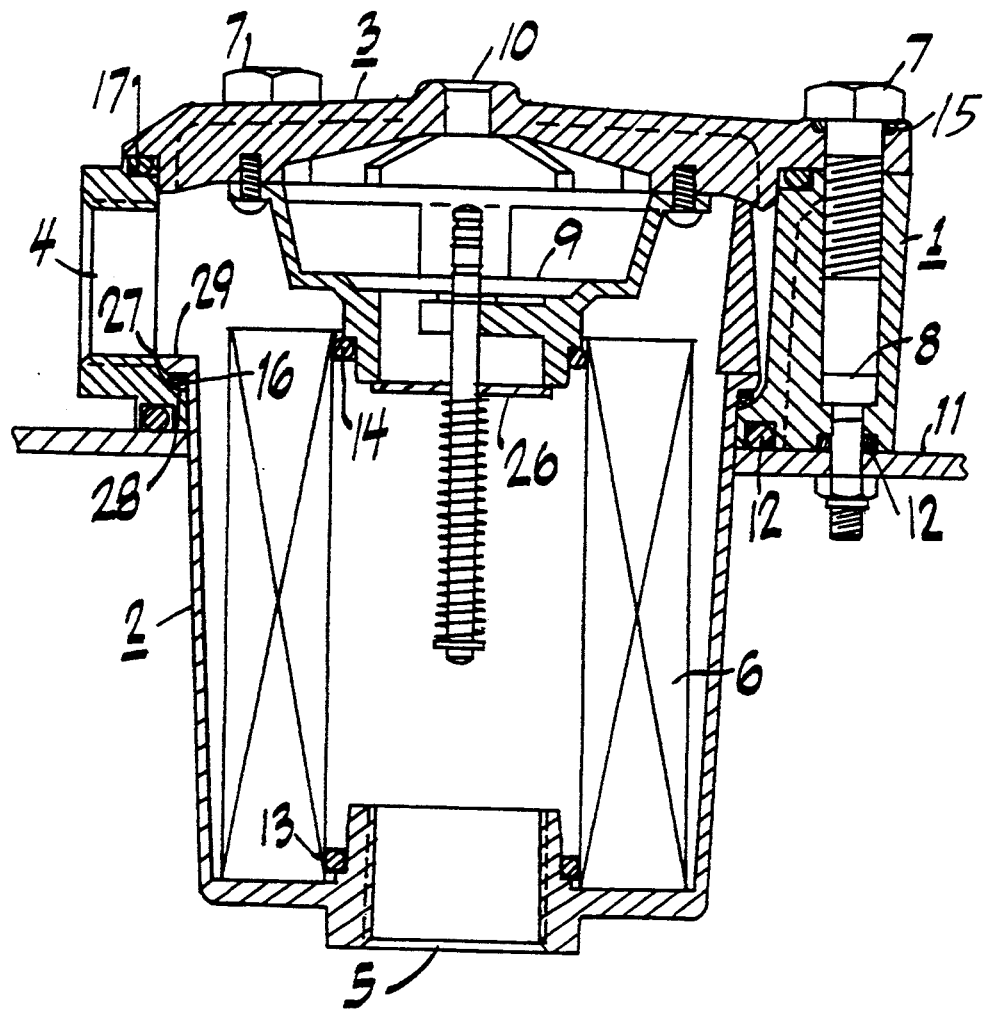
FIG. 6 is a cross sectional side elevation view of an alternate embodiment of the reservoir filter of the present invention.

The access cover 3 also includes a plurality of axially extending fingers 18. As the access cover 3 is bolted onto the filter body 1, the fingers 18 positively force the top surface 29 of the flange 27 of the bowl 2 downward against the ledge 28 of the filter body 1 so that the integrity of the seal between the bowl 2 and the filter body 1 formed by the sealing means 16 is not compromised. The integrity of the seal is maintained even during suction operations which create large negative pressure differentials in the cavity of the filter. In a preferred embodiment, the number of axially extending members 18 is three. These members are preferably separated by a angle which equals 360 degrees divided by the number of axially extending members. The width of each member 18 preferably decreases as the member extends away from the access cover 3. FIG. 6 illustrates an alternate embodiment of the present invention in which rather than providing the access cover 3 with downward extending members, the periphery of the bowl 2 may be provided with similar upward extending members. In a further alternate embodiment, a separate segmented spacer and/or adapter may be disposed between the access cover 3 and the bowl 1 to provide a similar means for positively holding down the bowl 1.

In the foregoing specification, the present invention has been described with reference to specific exemplary embodiments thereof. Clearly, however, various modifications and changes may be made without departing from the broader teaching of the specification and scope of the present invention. Accordingly, the specification and drawings are to be regarded in an illustrative, rather than in a restrictive, sense.

What is claimed is:

1. A reservoir filter housing adapted to accommodate a replaceable, substantially cylindrical, filter element having an inner radial surface and adapted for use in suction and return line applications, the reservoir filter housing comprising:
    a) a bowl, said bowl
        i) having a top end and having a bottom end with an opening defining a port for connection to one of a suction line and return line, and
        ii) said port including means for sealingly engaging the inner radial surface of said filter element;
    b) a filter body, said filter body
        i) having an opening defining a port for connection to one of a suction line and return line,
        ii) having a top end and a bottom end, and
        iii) including means for holding said bowl such that said top end of said bowl is slightly above said bottom end of said filter body and said bottom end of said bowl extends below said bottom end of said filter body; and
    c) an access cover, said access cover
        i) having a first surface,
        ii) being directly sealed against said top end of said filter body, and
        iii) having a plurality of fingers, said fingers extending perpendicularly from said first surface of said access cover and forcing said bowl against said filter body such that adequate sealing forces are maintained in negative and/or positive pressure differential suction and return line applications.

2. The reservoir filter of claim 1 further comprising:
    d) first means for sealing said access cover with said filter body; and
    e) second means for sealing said bowl with said filter body.

3. The reservoir filter of claim 2 wherein said first and second means for sealing are O-rings.

4. The reservoir filter of claim 1 wherein said plurality of fingers consists of three fingers located on a circle and separated from one another by an angle of approximately 120 degrees.

5. The reservoir filter of claim 1 wherein said fingers are integrally formed with said access cover.

6. The reservoir filter of claim 5 wherein said access cover and bowl are formed by casting.

7. The reservoir filter of claim 1 wherein the width of each of said fingers decreases as each finger extends away from said first surface of said access cover.

8. A reservoir filter housing adapted to accommodate a replaceable, substantially cylindrical, filter element and adapted for use in suction and return line applications, the reservoir filter housing comprising:
    a) a bowl, said bowl
        i) having a top end and having a bottom end with an opening defining a port for connection to one of a suction line and return line, and
        ii) being adapted to hold said filter element;
    b) a filter body defining an interior chamber, said filter body
        i) having an opening defining a port for connection to one of a suction line and return line,
        ii) having a top end and a bottom end, and
        iii) including means for holding said bowl such that said top end of said bowl is slightly above said bottom end of said filter body and said bottom end of said bowl extends below said bottom end of said filter body; and
    c) an access cover, said access cover
        i) having a first surface facing said interior chamber, ii) being directly sealed against said top end of said filter body, and iii) having a plurality of fingers, said fingers extending perpendicularly from said first surface of said access cover and forcing said bowl against said filter body such that adequate sealing forces are maintained in negative and/or positive pressure differential suction and return line applications, wherein said access cover includes a by-pass valve on its first surface for permitting fluid to bypass said filter element when a pressure differential across said filter element exceeds a predtermined limit, said by-pass valve including a projection for forming a friction fit with an inner radius of said filter element.

9. A reservoir filter housing adapted to accommodate a replaceable, substantially cylindrical, filter element having an inner radial surface and adapted for use in and return line applications, the reservoir filter comprising:

a) a bowl, said bowl
 i) having a top end and having a bottom end with an opening defining a port for connection to one of a suction line and return line, and
 ii) being adapted to hold said filter element,
 iii) said top end including a radially outwardly extending flange defining a top surface;
b) a filter body, said filter body
 i) having an opening defining a port for connection to one of a suction line and return line,
 ii) having a top end and a bottom end, and
 ii) holding said bowl such that said top end of said bowl is slightly above said bottom end of said filter body and said bottom end of said bowl extends below said bottom end of said filter body;
c) an access cover, said access cover
 i) being directly sealed against said top end of said filter body; and
d) means for positively forcing the flange of said bowl against said filter body such that adequate sealing forces are maintained in negative and/or positive pressure differential suction and return line applications wherein said means for positively forcing includes fingers integrally formed with the top surface of said bowl and extending up towards and engaging said access cover.

10. A reservoir filter housing adapted to accommodate a replaceable cylindrical filter element having an inner radial surface and adapted for use in suction and return line applications, the reservoir filter housing comprising:

a) a filter bowl, said filter bowl
 i) having a first end, said first end having a base including an opening defining a port, said port including a substantially cylindrical projection which has an outer radial surface sized to form a friction fit with the inner radius of said filter element, and
 ii) having a second end, said second end being open and having an annular flange on its radially outer surface, said flange having a first surface facing in a direction towards said first end and a second surface facing in a direction away from said first end;
b) a filter body defining an interior chamber, said filter body
 i) having a radial opening defining a second port,
 ii) having an open first end,
 iii) having an open second end, said second end having an annular radially inward projecting ledge on an inner surface thereof, said annular radially inward projecting ledge having a first surface for holding said filter bowl; and
c) an access cover, said access cover
 i) being sized to fit over and seal said open first end of said filter body,
 ii) having a first surface facing said interior chamber,
 iii) having an axial extension formed on said first surface of said access cover, said axial extension including a section having a substantially cylindrical outer surface with an outer radius sized to form a friction fit with the inner radial surface of said filter element, and
 iv) having a plurality of fingers, said fingers extending axially from said first surface of said access cover, and
 contacting said first surface of said flange of said filter bowl such that said second surface of said flange of said filter bowl is held against said first surface of said annular radially inward projecting lip of said filter body.

11. The reservoir filter of claim 10 wherein said first end of said filter bowl has a smaller outer radius than said second end of said filter bowl.

* * * * *